Nov. 5, 1929.  A. L. ROBERTS  1,734,403
POWER BRAKE MECHANISM
Filed Nov. 21, 1927  3 Sheets-Sheet 1
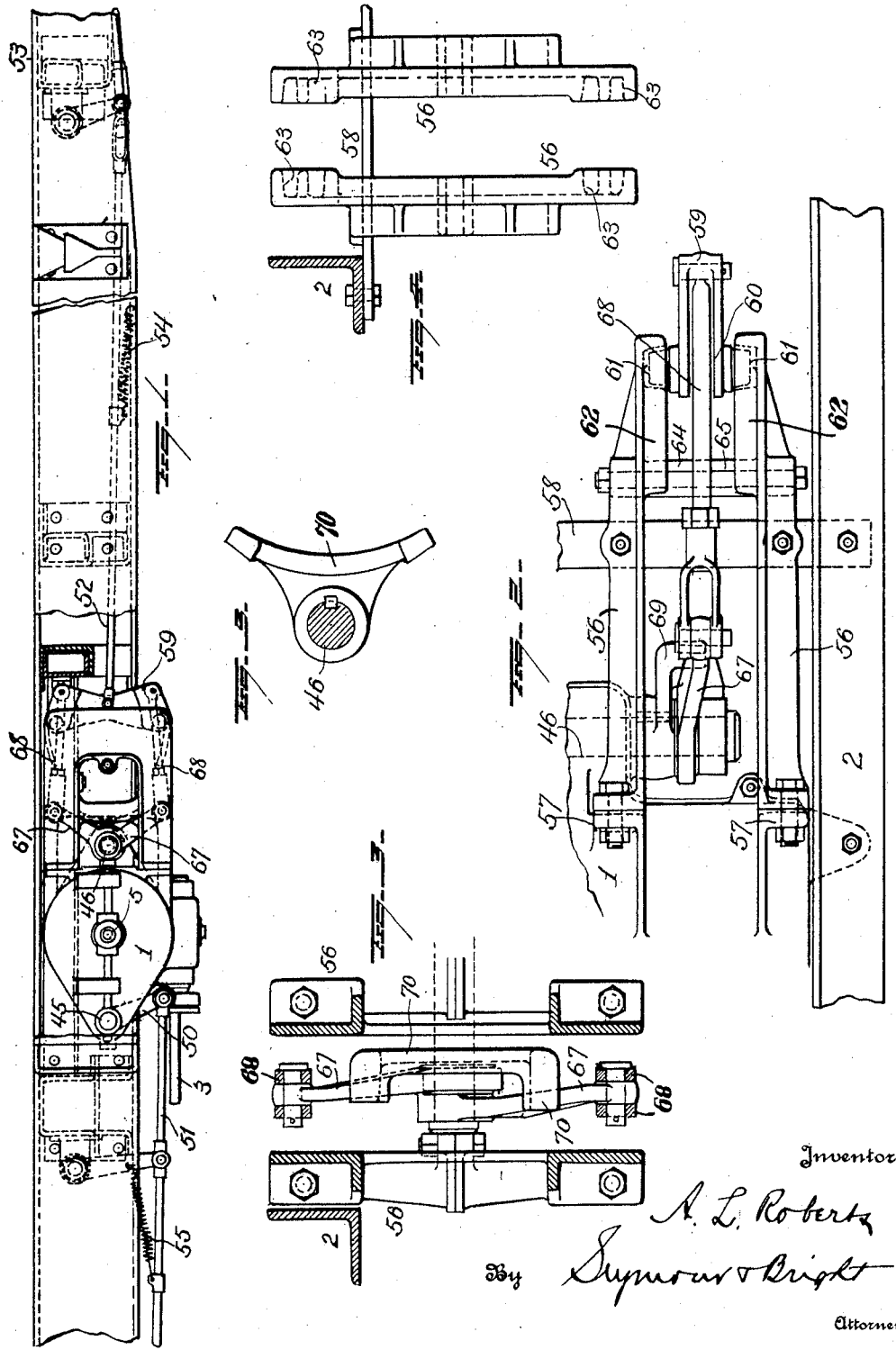

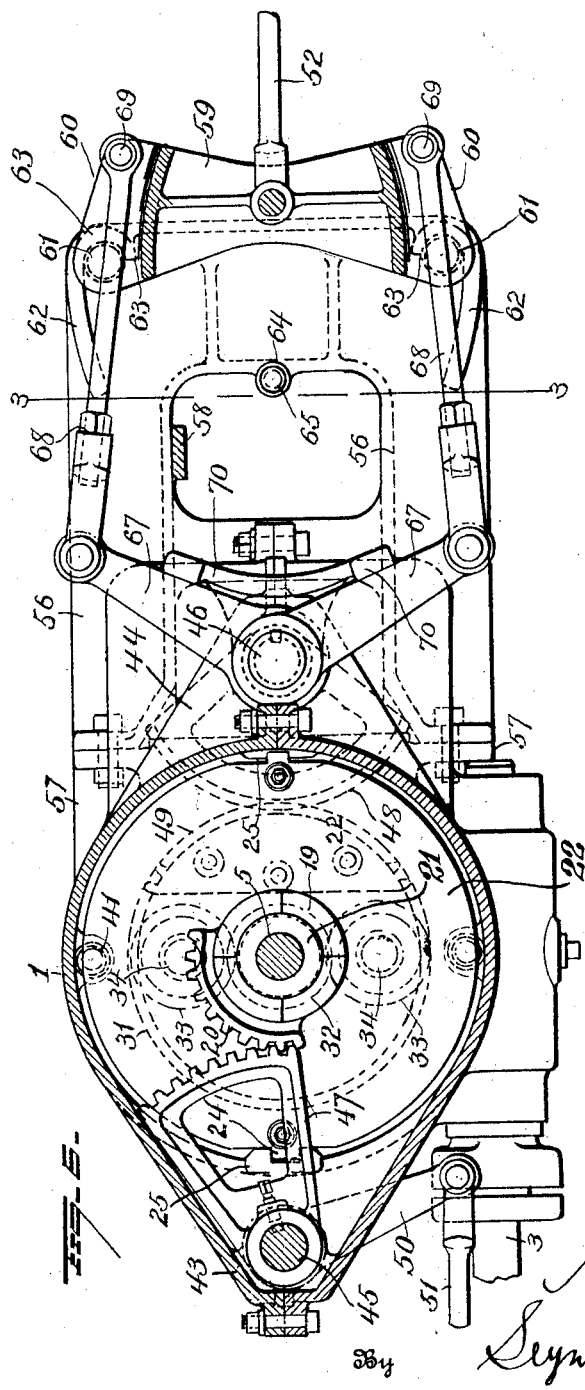

Nov. 5, 1929.　　　A. L. ROBERTS　　　1,734,403
POWER BRAKE MECHANISM
Filed Nov. 21, 1927　　　3 Sheets-Sheet 3
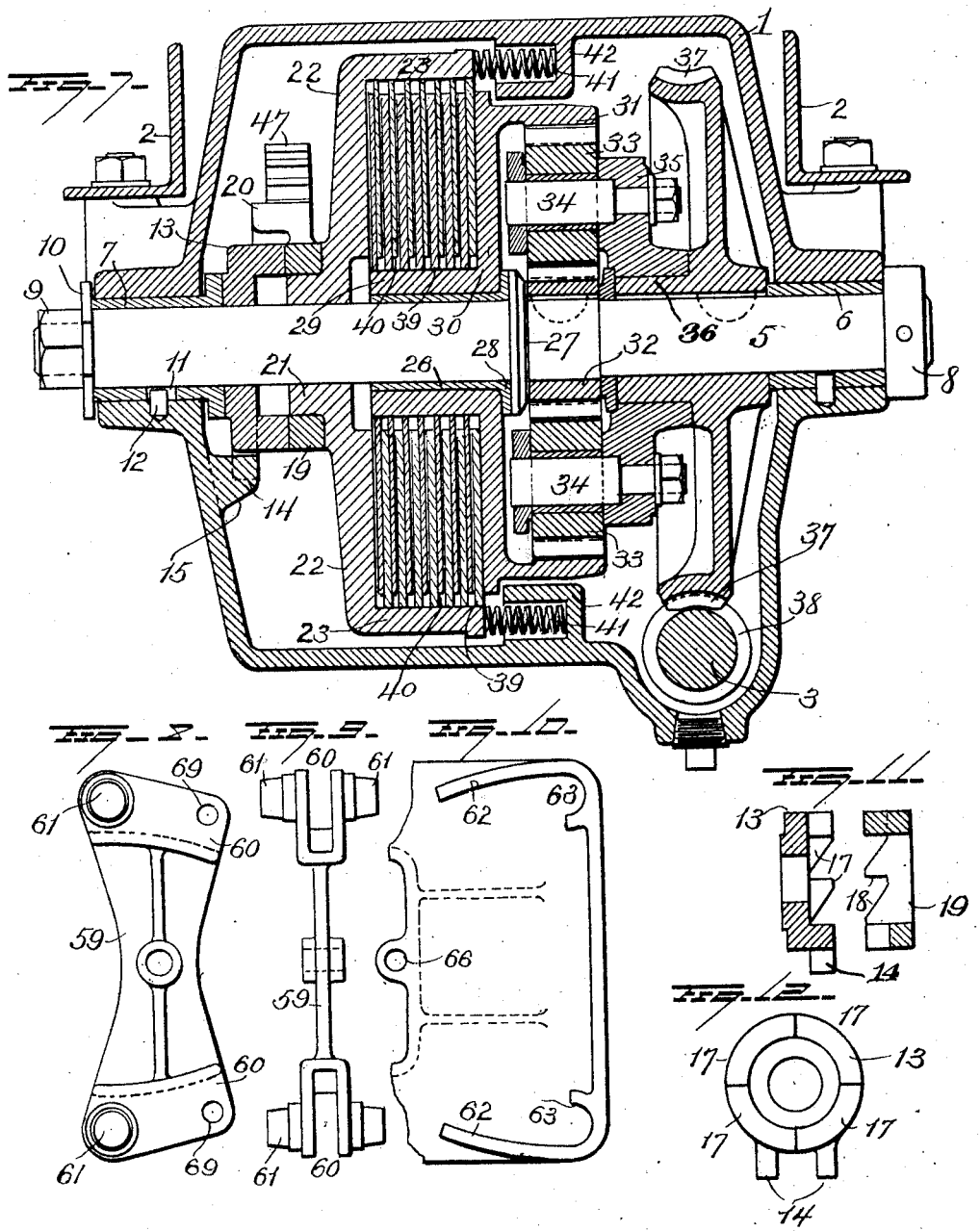
Inventor
A. L. Roberts
By Seymour & Bright
Attorneys Patented Nov. 5, 1929

1,734,403

UNITED STATES PATENT OFFICE

ALVIN L. ROBERTS, OF PHILADELPHIA, PENNSYLVANIA

POWER-BRAKE MECHANISM

Application filed November 21, 1927. Serial No. 234,761.

My invention relates to improvements in brake mechanism in which power from a rotating shaft of a motor vehicle is utilized in applying the brakes,—this application embodying improvements upon that which is disclosed in application for patent filed by me on the 15th day of April, 1927, and designated by Serial No. 183,998.

One object of my present invention is to provide a positive and reliable mechanism to apply a braking force to a motor vehicle, in which power may be taken from any desired rotating shaft on the vehicle, regardless of the direction of rotation of such shaft, or whether the vehicle is running forwardly or backwardly, and thus relieve the operator from the severe muscular effort required to control the movement of a vehicle with the use of brakes applied with power acquired solely from the operation of a foot lever.

With this and other objects in view, the invention consists in certain novel features of construction and combinations of parts as hereinafter set forth and pointed out in the claims.

In the accompanying drawings;

Figure 1 is a view partly in side elevation and partly in section, illustrating an application of my improvements;

Figure 2 is a fragmentary plan view of a portion of the structure shown in Figure 1;

Figure 3 is a view in section on the line 3—3 of Figure 6;

Figure 4 is an edge view showing the trunnion brackets;

Figure 5 is a separate view showing the lever 70 on the shaft 46;

Figure 6 is a view partly in section and partly in side elevation, illustrating the means for imparting a pulling action to the brake rod when the brake-controlling mechanism is actuated by power derived from a shaft running in one direction or the other;

Figure 7 is a sectional view through the enclosed mechanism including the gearing and clutch devices, and Figures 8, 9, 10, 11 and 12 are views of details.

While my improvements are applicable to motor vehicles of various types, still they are intended for use particularly on heavy busses and trucks.

A casing 1 made in upper and lower sections secured together, is supported by angle beams 2—2 forming part of the chassis and said casing is preferably located in the space between one of the side members of the chassis and the central power shaft. The casing 1 supports a driving shaft 3 which is extended forwardly to a point from which it can be conveniently driven. The driving shaft 3 may be connected with and be driven directly from the engine or it may be geared to the propeller shaft, as it is immaterial as to the direction of rotation of the said shaft 3. This shaft may be driven through the medium of gearing from any convenient driven shaft of the vehicle, but I prefer to employ spur gearing (not shown) which will provide some reduction of speed for said shaft, and a speed of rotation to be obtained satisfactory for the operation of the brake.

A central shaft 5 extends through the casing 1 and is mounted, through the medium of bushings 6, 7, in the end portions thereof. One end of the shaft 5 may have a collar 8 secured thereto and made to overlap the outer end of the bushing 6 and also the enlargement of the casing in which said bushing is located. The other end of the shaft 5 is provided with a threaded shank which receives a nut 9 between which and the outer end of the bushing 7, a washer 10 may be located. The bushing 7 is of such length relatively to the length of the enlargement on the casing in which it is mounted, that said bushing is permitted to have a slight endwise movement,—the opening 11 in the bushing into which the pin or key 12 enters being somewhat elongated to facilitate such endwise movement of the bushing.

A cam member 13 is mounted on the shaft 5 and abuts against the inner flanged end of the bushing 7. To prevent rotation of the member 13, it may be provided with spaced lugs 14 which straddle a lug 15 in the casing 1.

The cam member 13 is made with an annular series of cam faces 17 which cooperate with similar cam faces 18 on a cam member 19,—the latter being provided with a spur gear segment 20 for a purpose hereinafter explained. The member 19 is rotatably mounted on the hub 21 of a clutch disk 22 having an annular flange 23, which disk is movable upon the shaft longitudinally of the latter but which is prevented from rotation by the engagement of lugs 24 thereon with notched enlargements 25 within the casing. A bushing 26 is fitted on the shaft 5 between a flange 27 thereon and the disk 22 and has a flange 28 abutting said flange 27. The hub 29 of a second clutch disk 30 is mounted on the bushing 26, and near its edge, said disk 30 is provided with an internal gear 31, and in the plane of this gear, a pinion 32 is keyed to the shaft 5 adjacent to the flange 27 on said shaft. Disposed between and meshing with the pinion 32 and the internal gear 31 are planetary pinions 33 mounted on pins or studs 34 carried by a frame 35 rotatably mounted on the hub 36 of a worm gear 37 keyed on the shaft 5. The worm gear receives motion from a worm 38 located within the casing and carried by the shaft 3.

Between the clutch disks 22 and 30 two series of clutch plates 39—40 are disposed, the plates 39 being carried by the flanged clutch disk 22 and the plates 40 (which alternate with the plates 39) being carried by the hub of the clutch disk 30. Normally the clutch plates of one series are slightly spaced from the clutch plates of the other series, and this is accomplished by the action of springs 41 which are seated in pockets 42 on the casing and bear against the free edge of the flange 23 of the clutch disk 22, as clearly shown in Fig. 7.

The casing is formed, at its front and rear respectively, with extensions 43 and 44 and rock shafts 45 and 46 are mounted in the respective extensions. A gear sector 47 is carried by the shaft 45 within the casing and meshes with the segmental gear 20 on the cam member 19, while a sector 48 on the shaft 46 within the casing enlargement 44 meshes with a rack 49 on the frame 35. A crank arm 50 is secured to and depends from the outer end of the shaft 45 and has attached to it, one end of a rod 51, the other end of which latter is to be connected with a pedal or hand lever, with the use of which the operator may control the operation of the brake applying mechanism. The shaft 46 is connected, through the medium of instrumentalities presently described, with a brake rod 52, the latter being connected with the brake rigging indicated generally at 53 in Figure 1. A spring 54 connected at one end with the framework of the car and at the other end with the brake rod 52 serves to retain the brakes in normal released position and a spring 55 connected at one end with the framework and at the other end with the rod 51 serves to retain the parts with which said rod is connected, in normal position.

Two brackets 56 are secured to projections 57 on the casing 1 and are also sustained by a cross bar 58 secured to the beams 2. The brackets 56 project rearwardly from the casing 1 and are spaced apart as clearly shown in Figure 2, to receive between them mechanism affording connections between the brake rod 52 and the shaft 46, said connections being such that a pull will be imparted to the brake rod to set the brakes, when the shaft 46 is turned in one direction or the other. Said connections include a lever 59 with the central portion of which the brake rod 52 is connected. The respective ends of the lever 59 are bifurcated and elongated as at 60—60 and from the inner ends of these portions of the lever 59, trunnions 61 project laterally at each side of the lever and at respective ends thereof, said trunnions being adapted to engage bearing flanges 62 on the inner faces of each bracket 56 at the top and bottom portions thereof. Each bearing flange 62 is made hook-shaped at its rear end as at 63 to receive the trunnions 61, and it will be evident that the lever 59 may turn on either the upper or the lower trunnions and in either case impart a pulling action to the brake rod 52 to effect the setting of the brakes. In order that a proper spacing of the brackets 50 shall be insured and maintained, said brackets may be spaced by a sleeve 64 and a bolt 65 passed through said sleeve and through holes such as indicated at 66 Figure 10 in said brackets, said bolt being provided at one end with a head and at the other end with a nut. Two arms 67 are mounted loosely on the projecting end portion of the shaft 46,—one of said arms projecting upwardly and rearwardly and the other arm projecting downwardly and rearwardly, and said arms are connected respectively, by means of adjustable connections 68, with the upper and lower ends of the lever 59 as at 69 in the rear portions of the elongated, bifurcated upper and lower ends of said lever. A lever 70 is keyed to the shaft 46 and engages the arms 67, 67 respectively above and below the mountings of said arms. It is evident that when the shaft 46 is turned in one direction, the lever 70, engaging the upper arm 67, will move the same forwardly, causing the lever 59 to turn on its lower fulcrums and impart a pull to the brake rod, and that when the shaft 46 is turned in the reverse direction, the lever 70, engaging the lower arm 67, will cause this lower arm to be moved forwardly and cause the lever 59 to turn on its upper fulcrums and impart a pulling action to the brake rod.

Since the shaft 3 is directly connected with some rotating shaft on the vehicle, it will always be in rotation in one direction or the other when driven, for instance, by the propeller shaft which is subject to rotation in either direction when the vehicle is in motion, either forward or backward. Rotation of the shaft 3 will cause rotation of the worm gearing 37—38, the center shaft 5 and the pinions 32—33. Since the spring 54 holds the brakes in off position and the rod 52 has a positive connection through the devices above described and through the shaft 46, sector 49 and rack 48 with the frame 35, said frame will be held normally stationary as long as the brakes are off. While the frame 35 is normally held stationary as above described, the meshing of the planetary pinions 33 with the internal gear 31 on the clutch disk 30, will cause the latter to rotate and carry with it, the clutch plates 40. The clutch disk 22 is pressed back by the springs 41 and the cam member 19 carried on the hub of said disk will likewise be forced back into intimate mesh with the cam member 13. As the clutch plates 39—40 are normally held slightly separated by the action of the springs 41 as previously explained, the disk 30 and the clutch plates 40 as well as the internal gear 31 carried by said disk are normally free to rotate without frictional contact of the sets 39 and 40 of friction plates.

When pressure is applied to the foot lever with which the rod 51 is connected, said rod will be drawn forwardly. This will cause a partial rotation of the gear sector 47 and motion will be imparted, through the gear segment 20 to the cam member 19. Rotation of the cam member 19 will cause separation of the two cam members 19 and 13 by the coaction of the opposing cam faces, thereby moving the clutch disk 22 and the clutch plates carried thereby, against the resistance of the springs 41 and bringing the clutch plates 39 into frictional cooperation with the clutch plates 40 carried by the clutch disk 30. The degree of pressure of the clutch plates 39 against the clutch plates 40, will depend upon and be proportional to the amount of movement of and pressure exerted on the foot lever with which the rod 51 is connected.

It will be remembered that the frame 35 is normally held stationary by the action of retracting spring 54 and that the internal gear 31 is rotating because it is being driven by reason of direct connection with the source of power. Pressure of the plates 39—40 of the friction clutch cannot stop rotation of said internal gear and the clutch disk 30 nor even retard the rotation thereof, but any pressure applied to the friction clutch to bring the clutch plates into frictional cooperation, will be transmitted in the form of a turning effort or torque to the frame 35. Continued movement of the foot lever will cause such torque to be increased to the point where it will overcome the resistance of the retracting spring 54, when the frame 35 will immediately begin to move in one direction or the other, depending on the direction of rotation of the driving shaft 3, this movement being imparted directly to the rack 49 and thence to the sector 47 and shaft 46, and continuing until the brake shoes are in contact with the brake drums. The movements of all the parts, including the foot lever, then cease. Continued pressure on the foot lever may then be increased and the mechanism caused to bring about effective braking action, and the application of the brakes will continue as long as pressure on the foot lever is maintained. Release of pressure from the foot lever will result in immediate release of the brake and the retracting springs 54 and 55 will return the parts to their normal positions.

Having fully described my invention what I claim as new and desire to secure by Letters Patent, is :—

1. In power brake mechanism, the combination with a brake rod, a rock shaft, power operated means for turning said shaft, and muscularly operable means for controlling said power operated means, of a lever keyed to said rock shaft, oppositely disposed pivotally supported arms engaged by said lever, a lever mounted for pivotal support at each of its ends, connections between said pivotally supported arms and respective ends of said last mentioned lever, and a connection intermediate the ends of the latter and the brake rod.

2. In a power brake mechanism, the combination with a rock shaft, power operated means for turning said rock shaft, and muscularly operable means for controlling the power operated means, of fixed supports having upper and lower elongated bearing means, a lever engaging at respective ends the respective upper and lower elongated bearing means, a brake rod connected with said lever intermediate the ends thereof, oppositely disposed pivotally supported arms, connections between the respective arms and respective ends of said lever, and a member fixed to said rock shaft and cooperable with each of the pivoted arms to move one or the other of said arms according to the direction of turning movement of the rock shaft and impart movement to said lever to rock the same upon either its upper or its lower bearing.

3. In a power brake mechanism, the combination with a rock shaft, power operated means for turning said rock shaft, and muscularly operable means for controlling the power operated means, of fixed spaced brackets each provided with upper and lower elongated bearing means, a lever entering between said brackets, laterally projecting trunnions at respective ends of said lever and cooperable with said upper and lower elongated bearing means, a brake rod connected with an intermediate portion of said lever, oppositely disposed pivoted arms, connections between the respective pivoted arms and respective end portions of said lever, and a member fixed to said rock shaft and cooperable with the pivoted arms to move one or the other according to the direction of rotation of the rock shaft and cause rocking of said lever on the trunnion bearings at one end or the other of said lever.

4. In a power brake mechanism the combination with a rock shaft, power operated means for turning said rock shaft, and muscularly operable means for controlling power operated means, of fixed supporting means, a lever having pivotal mounting at each of its ends on said supporting means, a brake rod connected with an intermediate portion of said lever, oppositely disposed arms loosely mounted upon said rock shaft, connections between the respective arms and respective ends of said lever, and a lever fixed to the rock shaft and engaging each of said arms.

5. In a power brake mechanism, the combination of a rock shaft, brake applying means connected with said rock shaft, a frame mounted to oscillate, gearing between said rock shaft and said frame, planetary gears carried by said frame, power driven means for rotating said planetary gears, two clutch disks, a gear carried by one of said clutch disks and meshing with said planetary gears, a set of clutch plates carried by each of the clutch disks, springs engaging one of said clutch disks and causing the clutch plates carried thereby to be maintained normally out of frictional cooperation with the clutch plates carried by the other clutch disk, and muscularly controlled means for moving one of said clutch disks relatively to the other against the resistance of said springs to bring the respective sets of clutch plates into frictional cooperation and cause turning of said frame to impart turning movement to said rock shaft and actuate the brake applying means connected with the same.

6. In a power brake mechanism, the combination of a rock shaft, brake applying means connected with said rock shaft, a frame mounted to oscillate, gearing between said rock shaft and said frame, planetary gears carried by said frame, power driven means for rotating said planetary gears, two clutch disks, a gear carried by one of said clutch disks and meshing with said planetary gears, a set of clutch plates carried by each of the clutch disks, springs engaging one of said clutch disks and causing the clutch plates carried thereby to be maintained normally out of frictional cooperation with the clutch plates carried by the other clutch disk, muscularly controlled means for moving one of said clutch disks relatively to the other against the resistance of said springs to bring the respective sets of clutch plates into frictional cooperation and cause turning of said frame to impart turning movement to said rock shaft and actuate the brake applying means connected with the same, and spring means connected with the brake applying means and operable to retain the brakes normally in "Off" position and also to normally prevent the turning of said rock shaft and the oscillatory frame geared therewith.

7. In power brake mechanism, the combination with a casing, a rock shaft, brake applying means connected with said rock shaft, an oscillatory frame, gearing between said oscillatory frame and said rock shaft, planetary gears carried by said oscillatory frame, power means for rotating said planetary gears, two clutch disks, one being movable relatively to the other, means cooperable with the casing to prevent said movable clutch disk from turning, a gear carried by the other clutch disk and meshing with said planetary gears, a set of clutch plates carried by each of said clutch disks, springs engaging the casing and said movable clutch disk and acting normally to retain the sets of clutch plates out of frictional cooperation, and muscularly controlled cam devices for moving the movable clutch disk to bring the sets of clutch plates into frictional cooperation.

8. In a power brake mechanism, the combination of a support, a lever mounted to rock about either of its ends on the support, a brake rod connected to said lever between the ends thereof, oppositely extending arms mounted to rock about a common center, connections between the free ends of said arms and corresponding ends of the lever, power-driven means for rocking said arms, and muscularly operated means for controlling said power-driven means.

9. In a power brake mechanism, the combination of a support, a lever mounted to rock about either of its ends on the support, a brake rod connected to an intermediate point of the lever, a rock shaft, connections between opposite sides of the rock shaft and the ends of the lever, cooperating clutch elements, planetary gearing connecting one clutch element with the rock shaft, power-driven means for actuating said gearing, means holding the clutch elements normally out of engagement whereby the rock shaft will be inactive and the clutch element geared thereto will rotate, means to hold the other clutch element against rotation, and muscularly operable means for effecting engagement of the clutch elements whereby both clutch elements will be held stationary and the rock shaft will be actuated to apply the brakes.

In testimony whereof, I have signed this specification.

ALVIN L. ROBERTS.